Patented Sept. 25, 1934

1,974,510

UNITED STATES PATENT OFFICE 1,974,510

PRODUCTION OF COLOR LAKES

Hans Reindel and Arthur Ohmer, Ludwigshafen-on-the-Rhine, Germany, assignors to General Aniline Works, Inc., New York, N. Y., a corporation of Delaware No Drawing. Application June 15, 1931, Serial No. 544,704. In Germany June 27, 1930

11 Claims. (Cl. 134—58.5)

The present invention relates to the production of color lakes.

We have found that very valuable color lakes are obtained by converting acid dyestuffs into lakes in the presence of aqueous solutions of water-soluble, amorphous, high-molecular polymerization or condensation products of aliphatic organic compounds containing a C=O group. These polymerization or condensation products are the water-soluble, amorphous products from the condensation of urea, or its derivatives, such as thiourea, with aldehydes, as for example formaldehyde, or from a methylol urea, and neutral, water-soluble, amorphous polymerization products of acrylic acid and its homologues, neutral water-soluble products of the mixed polymerization products from acrylic acid and styrene, acrylic acid and vinyl alkyl ethers or vinyl esters, or maleic acid and styrene.

The said mixed polymerization products as well as the polymeric acrylic acid (the sodium salt of which latter may be obtained, for example by the saponification of polymeric acrylic nitrile with the aid of aqueous caustic soda solution while warming) are equally suitable in the neutral state, i. e., in the form of the water-soluble alkali metal salts. The mixed polymerization products from maleic acid and styrene possess apparently a structure analogous to that of those from acrylic acid and styrene.

In order to obtain a very quick homogenization of the reaction mixtures small amounts of organic water-soluble solvents, such as methanol, ethanol, ethylene glycol or glycerol may be added. Particularly good results can be obtained by carrying out the laking operation in the presence of organic dispersing agents, such as Turkey red oil, inspissated sulphite waste liquor or naphthalene, or alkyl naphthalene sulphonic acids, and especially with resin soaps, such as rosin alkali soaps.

The acid dyestuffs may be chosen from any acid dyestuffs usually employed for the conversion into lakes, i. e. into water-insoluble salts with bases such as calcium, barium, aluminium or iron, the nature of the base depending on the particular dyestuff employed; particularly valuable lakes are obtained from acid azo dyestuffs containing one or more carboxyl and/or sulphonic groups, but also acid triphenyl methane dyestuffs may be employed.

The quantities of the amorphous, polymerization or condensation products employed are generally from 20 to 500 grams per each gram molecule (molecular proportion in grams) of the dyestuff employed and in most cases from 50 to 200 grams of polymerization or condensation product will be employed for the said quantity of dyestuff; the quantities of the said neutral polymerization products from the aforesaid acids may be about the same as, but are generally lower than, those of a urea-aldehyde condensation product and usually about one half of the latter. The additions of dispersing agent employed are generally between 50 and 600 grams per each gram molecule of the dyestuff employed and in most cases from 100 to 300 grams. Dispersing agents containing acid radicles, such as the resin soaps, are usually precipitated in the laking operation along with the dyestuffs so that the final products will contain substantial proportions of water-insoluble salts of the dispersing agents. In the finished products from about 4 to 22 grams, preferably from 6 to 12 grams, of urea-aldehyde condensation product will be present or from 3 to 50 grams, preferably from 5 to 10 grams, of neutral polymerization products from the aforesaid acids per each gram molecule of the dyestuff employed, if desired together with from 20 to 300 grams, preferably from 20 to 150 grams, of dispersing agents.

The conversion into lakes is preferably effected in the usual manner, for example by adding the polymerization or condensation product chosen to a solution of the dyestuff and adding a water-soluble salt of the base intended for the production of the lake, or by proceeding in any other desired order. The reaction is usually carried out while warming the reaction mixture and keeping it warm for some time after the reaction. Color lakes are thus formed which are distinguished from the color lakes hitherto prepared from the same initial materials in that they no longer have their great covering power but are glazed and no longer show the strong bronze lustre which is frequently troublesome in saturated oil coatings from drying or non-drying vegetable oils, dispersions in alcohols or cellulose lacquers. Furthermore they have a special bluish shade of color and are more valuable and give stronger shades than products obtained with the aid of the dispersing agents solely, especially if the lakes are to be adulterated, for example with zinc white.

The following examples will further illustrate the nature of this invention but the invention is not restricted to these examples. The parts are by weight.

Example 1

42 parts of the dyestuff obtained by coupling the diazo compound of 1-CH$_3$-3NH$_2$-benzene-6-sulphonic acid with beta-naphthol are dissolved in 1000 parts of water at 50° C., 80 parts of a 10 per cent aqueous colophony-sodium soap solution and then 70 parts of a 10 per cent aqueous solution of the sodium salt of polymerized acrylic acid (obtainable by saponifying polymeric acrylic nitrile with the aid of 110 per cent of the stoichiometrical quantity of caustic soda in the presence of a quantity of water sufficient to give a 25 per cent solution of the sodium salt at from 85 to 92° C. and drying the salt) are allowed to run into the solution. After the addition of 30 parts of sodium acetate, 25 parts of barium chloride in the form of a 10 per cent aqueous solution are added at 50° C. The temperature is raised during the course of 1 hour to 70° C., the whole is kept at the said temperature for half an hour and the product is worked up in the usual manner.

*Example 2*

44 parts of the dyestuff obtained by coupling the diazo compound of 1-CH₃-4NH₂-benzene-3-sulphonic acid with 2.3-hydroxynaphthoic acid are dissolved in 6000 parts of water at 90° C. The temperature is allowed to fall to 70° C. and then 100 parts of a 10 per cent aqueous solution of colophony-sodium soap, 100 parts of a 10 per cent aqueous solution of a urea-formaldehyde condensation product, prepared by heating dimethylol urea and formaldehyde in a weakly acid aqueous solution at 95° C. and subsequent neutralization with the aid of tri-sodium phosphate and 50 parts of sodium acetate are added, 20 parts of calcium chloride in the form of a 10 per cent aqueous solution are then added at 70° C., the whole is kept at the said temperature for about half an hour, heated to 80° C. within half an hour and kept at this temperature for half an hour. The product is then worked up in the usual manner.

*Example 3*

100 parts of commercial Lithol Red R (Schultz, Farbstofftabellen 1923, vol. 1, No. 173) in the form of a paste containing 40 per cent of the dyestuff are made into a paste at room temperature with 300 parts of a 10 per cent aqueous solution of colophony-sodium soap and 175 parts of a 10 per cent aqueous solution of a urea-formaldehyde condensation product prepared by heating urea and formaldehyde in a weakly acid aqueous solution at about 80° C. and subsequent neutralization with the aid of tri-sodium phosphate.

After about 8 parts of aqueous caustic soda solution of 40° Baumé strength have been added to the suspension of dyestuff it is laked with 12 parts of calcium chloride in a 10 per cent solution, added at room temperature, and the whole is heated to about 100° C. and kept at the said temperature for from 1 to 2 hours. The color lake is then filtered, washed with hot water and dried. A bordeaux red clear modification of the calcium salt of the dyestuff is obtained, the product containing about 2 per cent of the salt of urea-formaldehyde resin and from 5 to 15 per cent of calcium rosinate depending on the intensity of washing.

Instead of the said urea-aldehyde condensation product about 50 parts of 10 per cent aqueous solutions of the mixed polymerization products from acrylic acid and styrene (50:50), maleic acid and styrene, acrylic acid and vinyl ethyl ether or from saponified acrylic nitrile may be employed together with 200 parts of the aforesaid resin soap solution.

What we claim is:

1. A color lake preparation comprising the calcium salt of Lithol Red, about 2 per cent its weight of urea-formaldehyde resin and from 5 to 15 per cent of calcium rosinate.

2. In the production of color lakes from Lithol Red and water-soluble base metal compounds yielding water-insoluble salts with said dyestuff, the step which comprises precipitating the color lake by the interaction of the said dyestuff with the said base metal compounds in the presence of a water-soluble amorphous polymerization product of an aliphatic polymerizable compound containing a C=O group.

3. In the production of color lakes from Lithol Red and water-soluble base metal compounds yielding water-insoluble salts with said dyestuff, the step which comprises precipitating the color lake by the interaction of the said dyestuff with the said base metal compounds in the presence of a water-soluble urea-formaldehyde condensation product.

4. In the production of color lakes from Lithol Red and water-soluble base metal compounds yielding water-insoluble salts with said dyestuff, the step which comprises precipitating the color lake by the interaction of the said dyestuff with the said base metal compounds in the presence of a water-soluble, neutral polymerization product of an acid of the acrylic acid series.

5. A color lake preparation comprising a water-insoluble base metal salt of Lithol Red and a water-soluble amorphous polymerization product of an aliphatic polymerizable compound containing a C=O group.

6. A color lake preparation comprising a water-insoluble base metal salt of Lithol Red and a water-soluble urea-formaldehyde condensation product.

7. A color lake preparation comprising a water-insoluble alkaline earth metal salt of Lithol Red and a water-soluble amorphous polymerization product of an aliphatic polymerizable compound containing a C=O group.

8. A color lake preparation comprising a water-insoluble alkaline earth metal salt of Lithol Red and a water-soluble urea-formaldehyde condensation product.

9. In the production of color lakes from Lithol Red and water-soluble base metal compounds yielding water-insoluble salts with said dyestuff, the step which comprises precipitating the color lake by the interaction of the said dyestuff with the said base metal compounds in the presence of a water-soluble, amorphous, high-molecular product of the group consisting of polymerization and condensation products of aliphatic organic compounds containing a C=O group.

10. A color lake preparation comprising a water-insoluble base metal salt of Lithol Red and a water-soluble, amorphous, high-molecular product of the group consisting of polymerization and condensation products of aliphatic organic compounds containing a C=O group.

11. A color lake preparation comprising a water-insoluble alkaline earth metal salt of Lithol Red and a water-soluble, amorphous, high-molecular product of the group consisting of polymerization and condensation products of aliphatic organic compounds containing a C=O group.

HANS REINDEL.
ARTHUR OHMER.